United States Patent [19]

Schiller

[11] 4,113,125
[45] Sep. 12, 1978

[54] REFUSE COLLECTING SYSTEM AND A VEHICLE AND CONTAINER FOR USE THEREIN

[76] Inventor: Rolf Schiller, Hoher Weg 8, D-7990 Friedrichshafen-Kluftern, Fed. Rep. of Germany

[21] Appl. No.: 752,845

[22] Filed: Dec. 21, 1976

[30] Foreign Application Priority Data

Dec. 23, 1975 [DE] Fed. Rep. of Germany ....... 2558433

[51] Int. Cl.² .......................... B65F 3/02; B65F 3/20; B65F 3/28
[52] U.S. Cl. ..................................... 214/302; 214/82; 214/83.3; 220/1 T; 220/22; 296/24 R
[58] Field of Search .............. 214/301, 302, 303, 83.3, 214/82, 518; 296/24; 220/22, 1 T

[56] References Cited

U.S. PATENT DOCUMENTS

| 1,475,483 | 11/1923 | Galuska | 296/24 R X |
| 3,823,973 | 7/1974 | Ramer | 214/302 X |
| 3,837,512 | 9/1974 | Brown | 214/302 |

*Primary Examiner*—Robert G. Sheridan
*Attorney, Agent, or Firm*—Michael J. Striker

[57] ABSTRACT

A system for accommodating and transporting materials, for example domestic refuses, includes a collecting vehicle having two or more chambers for receiving the materials and a plurality of collecting containers each having the same number of material receiving chambers as the vehicle so that when one of the collecting containers is applied to the vehicle for transferring the materials from the collecting container to the vehicle, the several chambers of the vehicle are adjacent the respective chambers of the collecting container.

20 Claims, 12 Drawing Figures

REFUSE COLLECTING SYSTEM AND A VEHICLE AND CONTAINER FOR USE THEREIN

This invention relates to a system for accommodating and transporting materials, for example domestic refuse.

By reason of the increasing shortage of raw materials, the recovery of usable materials from household refuse is acquiring significance. The recovery of usable materials such as glass, sheet metal and paper from domestic refuse can be provided for by separating the constituents in a household, or by separate preparation and disposal, or by sorting in apparatus constructed for the purpose.

A disadvantage of known apparatus is not only in high investment and running costs, but in the relatively poor quality of the often dirty used paper which is recovered, and which may include a considerable proportion of plastics materials and non-usable paper such as milk cartons.

Separate disposal for example of used glass and paper from households, as experiments have shown, necessitates the use of buckets or bags to provide a constant stimulus for separate collection. The quality achieved is in general good. The used paper and glass collected can be carried to a further utilisation station, since it is not dirtied by other refuse constituents. The best results of collection have been achieved in residential areas with a predominent number of single or two-family buildings, i.e. detached and semi-detached house buildings. This type of collection is however burdened by high costs, since relatively few buildings are visited per kilometer of collection distance.

Whether with or without a container, separate disposal of usable materials requires the use of a special crew and a vehicle. The crew consists in most cases of a driver and two loaders. To reduce collecting costs, consideration has already been given to the use of a trailer which can be coupled to the usual refuse collecting vehicle, but such an assembly cannot be used in many residential areas.

To save costs, re-usable materials are collected only every 3 to 6 weeks. However, this presupposes storage space in households and frequently such space does not exist, particularly in modern dwellings, i.e. multiple-family buildings.

An object of the invention is to provide a system for collection of domestic refuse, by means of which separation of waste materials can be carried out in the household and with which it is possible to carry away separated waste materials without increasing labour costs and working time, and without using bulky vehicles.

According to this invention, there is provided a system for accommodating and transporting materials, for example domestic refuse, comprising a collecting vehicle and a plurality of collecting containers, wherein the vehicle has two or more chambers for receiving the materials and wherein each collecting container has the same number of material receiving chambers as the vehicle so that when a collecting container is applied to the vehicle for transferring the materials from the collecting container to the vehicle, the several chambers of the vehicle are adjacent the respective chambers of the collecting container. Such a system requires only a comparatively small additional amount of structure on the vehicle. The system makes it possible to collect refuse in a shorter time than before, since there is no separate collecting of the re-usable materials. Thus, by saving labour, it is possible to achieve a reduction in cost. In that the waste materials are separated in households and transported in the separated condition, it is possible to achieve a good yield of recoverable, re-usable materials. The quality of the separated usable materials, as experiments have shown, is good, so that the users of these materials are not involved in substantial additional work in the cleaning of the materials beyond that normally required.

The collecting container may be sub-divided into chambers corresponding to the sub-division of the receiving apparatus of the vehicle. It is advantageous to separate refuse in individual households by means of multi-chamber domestic refuse collecting containers. The containers, adapted to fit the receiving apparatus on the vehicle, simplify reception of refuse by the vehicle, both with regard to loading time and the cost entailed thereby.

The receiving apparatus may have separate feed chambers communicating with filling shafts and separate loading chambers may be formed between them and the storage chambers of the vehicle.

A feed or loading shovel may be associated with each feed or loading chamber.

For reception of several collecting containers simultaneously, the receiving apparatus may have filling apertures disposed one above another, each with a number of divided apertures.

In order to form vertical of approximately vertical filling shafts, the receiving apparatus may comprise filling partitions which at the same time divide the filling apertures into partial apertures.

This possibility of simultaneously accommodating two or more multi-chamber collecting containers can provide for further shortening of loading time and, by reason of the particular disposition of the filling apertures and of the shafts inside the receiving apparatus, allow reliable separate feeding of refuse to the associated storage chambers of the vehicle.

There may be baffles adjacent the filling partitions, for the separate distribution of incoming refuse over the separate feed chambers and the baffles may be adjustable about spindles; operators may thus have an opportunity of redirecting refuse arbitrarily into some other than the envisaged chamber in the receiving apparatus. Thus, particularly dirty re-usable materials, for examle paper, can be fed not to the separate chamber for paper, but to a chamber for receiving residual refuse.

There may be provision for the filling partitions and for the storage space partitions, as well as the partitions of the collecting containers, to be adjustably disposed so that both the vehicle and the collecting containers may suit varying refuse makeup and/or to suit a variation in the quantity of individual groups of waste materials.

A pressure panel with its own adjusting apparatus may be disposed in each storage chamber extending in the longitudinal direction of the vehicle. This construction is advantageous in that re-usable materials received into the individual storage chambers of the vehicle, or the residual refuse, can also be separately discharged. This means that a vehicle, for example on its way to a refuse depot, can carry for example paper to a user, so saving in distance travelled and in time.

The disposition of the individual chambers in the collecting container can be such that the chambers are side by side. Further, it is possible to start on a basis of three separate chambers although this is not a condition. The middle one of for example three chambers may receive residual refuse, for example kitchen waste, while the second chamber may be used for accommodating used glass and the third chamber for used paper.

The receiving apparatus on the vehicle, and particularly the apertures thereof, may be adapted to suit the collecting containers.

The invention will now be described by way of example, with reference to the accompanying diagrammatic drawings, in which.

Referring to the drawings, a collecting vehicle 2 has a chassis 3 which carries a cab 4, a receiving container 6 and receiving apparatus 5 associated with the receiving container 6. As will be explained below, the container 6 constitutes a storage space in the vehicle.

As can be seen in FIGS. 1 to 4b, inside the receiving container 6 is a compacting apparatus which serves for ejecting received materials from the receiving container 6. Collecting containers 10, (which are here domestic refuse collecting containers) are used in individual households or jointly for several households which have to be serviced.

Figures 1, 2:
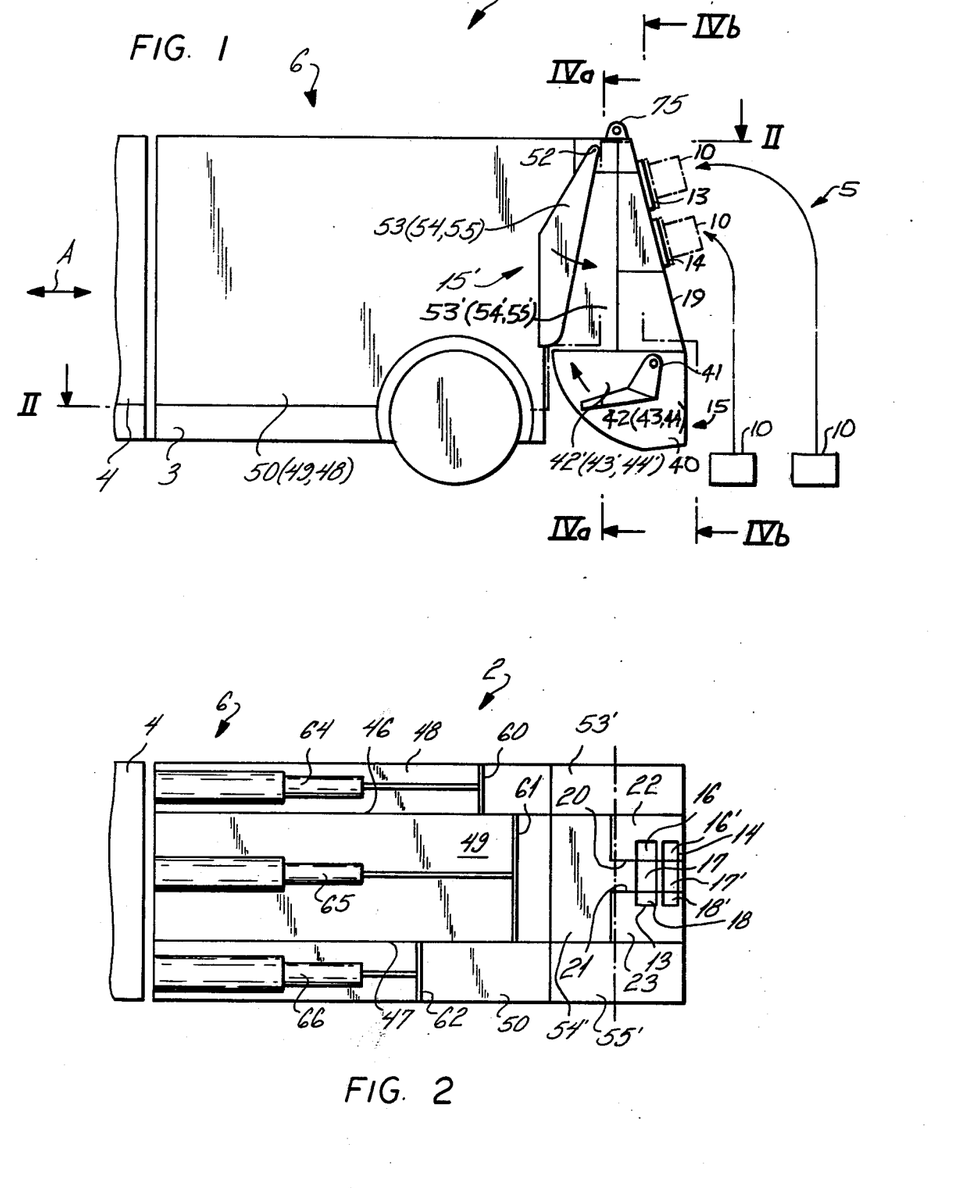
FIG. 1 is a side elevation of a transporting vehicle.
FIG. 2 is a horizontal section on line II—II of FIG. 1.

Also on the vehicle 2 or on the receiving apparatus 5 is a lifting apparatus (not shown), by which collecting containers 10 are lifted so that collected refuse can be transferred to the receiving container 6, i.e., as indicated by the long arrows in FIG. 1.

The receiving apparatus 5 comprises a feeder apparatus 15 which is composed of a feeder skip 40 having a horizontal pivoting axis 41 and feeder shovels 42, 43 and 44 mounted at that axis. The shovels are disposed one beside another and vertical separating walls extend into the receiving container 6 and, in conjunction with the shovels, form separate feeder chambers 42', 43' and 44'.

Figure 4A:
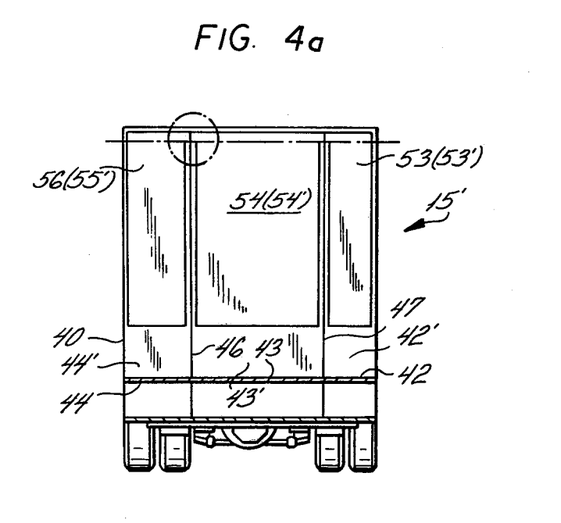
FIG. 4a is a cross-section on line IVa—IVa of FIG. 1.
Figure 4B:
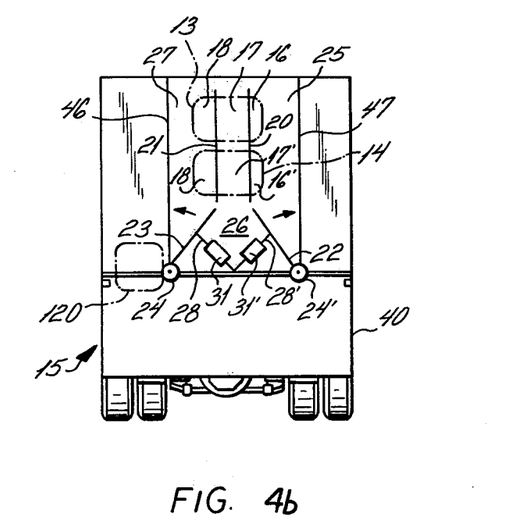
FIG. 4b is a cross-section on line IVb—IVb of FIG. 1.

The receiving apparatus 5 has two filling apertures 13, 14 one above the other. Also within the receiving apparatus 5 are upright filling partitions 20 and 21 (FIGS. 2 and 4b) extending in planes parallel to the longitudinal axis of the vehicle (arrow A, FIG. 1) which sub-divide the load space of the receiving apparatus 5 into three vertical shafts 25, 26 and 27. One end face of each partition 20 and 21 rests on the inner face of the rear end wall 19 of the receiving apparatus 5. Transversely of the axis A the partitions 20 and 21 are spaced at such a distance apart and from the side walls of the receiving apparatus 5 that the filling apertures 13 and 14 are in each case sub-divided into three partial apertures 16, 17 and 18 and 16', 17', 18' (FIGS. 2 and 4b). In like manner the collecting containers 10 are sub-divided. The partitions 20 and 21 merge at their lower ends into respective baffles 22, 23 which are also parallel to the axis A, but are directedooutwardly with respect to the vertical. Each baffle 22 and 23 pivots about an axis 24, 24' (FIG. 4b) and each is engaged by a linkage 28, 28' each of which co-operates with a respective piston of a hydraulic ram 31, 31' for joint or separate movement of the baffles 22, 23.

The purpose of the baffles 22, 23 is separately to distribute separately charged-in refuse over the width of the feeder chambers 42', 43' and 44' or the width of the chamber inside the receiving container 6. The adjustability of the baffles 22 and 23 permits re-direction of the type of refuse out of one of the filling shafts 25, 26 and 27 into an adjacent feeder chamber 42', 43' or 44'.

The receiving apparatus 5 also has means of charging refuse fed by the feeder shovels into the receiving container 6. In accordance with the separate feeding of the refuse by the feeder shovels 42, 43 and 44, there is a corresponding number of loading shovels 53, 54 and 55 in a loading apparatus 15' which pivots about a common pivoting axis 52 which extends transversely to the longitudinal direction of the vehicle.

Loading shovels 53, 54 and 55 in conjunction with storage chamber partitions 46 and 47 extending between the shovels and in the longitudinal direction form load chambers 53', 54' and 55' which on the one hand separately discharge into a respective feeder chamber 42', 43', 44' and on the other into storage chambers 48, 49 and 50 formed by the partitions 46 and 47, or are brought into communication with them according to the position of the feeder or loading shovels, as the case may be.

In each storage chamber 48, 49 and 50 is a transverse, vertical pressing plate 60, 61, 62 which fill the cross-section of the respective storage chambers, leaving clearance for movement in respect of the end walls on partitions 46 and 47 of the collecting container 6. These pressing plates are moved longitudinally by a hydraulically operable telescopic linkage 64, 65, 66, and serve on the one hand to compress received refuse and on the other they serve to eject the refuse from the receiving container 6 to a tip. This pressing apparatus permits of separate compaction in each storage chamber 48, 49 and 50 and also of separate ejection of the refuse.

Figure 5:
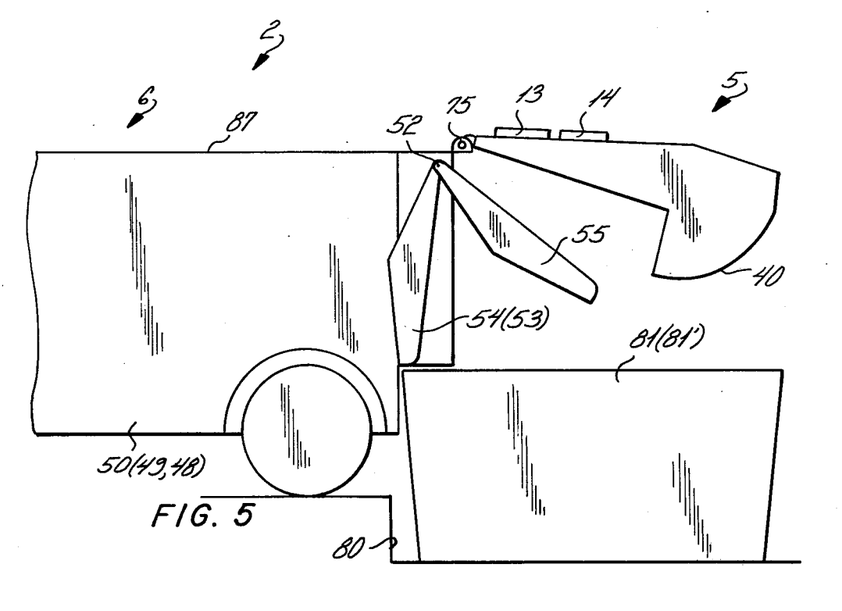
FIG. 5 shows the vehicle with receiving apparatus in the emptying position.
Figure 5A:
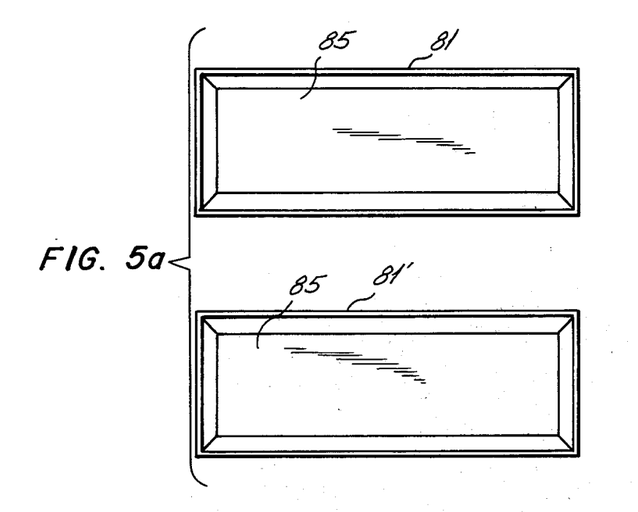
FIG. 5a is a top view of containers shown in FIG. 5.

As FIGS. 5 and 5a show, the entire receiving apparatus 5 is pivotable about an axis 75, so that the storage chambers 48, 49 and 50 are open at the back and can be emptied jointly or separately by the pressing plates 60, 61, 62. For this purpose, for example for a tip, a pit 80 receives containers 81 and 81', which in this case have receiving chambers 85. In this respect, it is envisaged that the residual refuse, for example kitchen waste and the like, is either held back in its chamber or is already emptied, and for the other two storage chambers to contain usable materials, such as glass and paper, separately, which are discharged into containers 81, 81'. The individual categories of refuse can also be discharged separately at different places suitable for the individual materials; for example they can be discharged at the premises of users of the usable materials en route, or at a tip, as the case may be.

Figure 6:
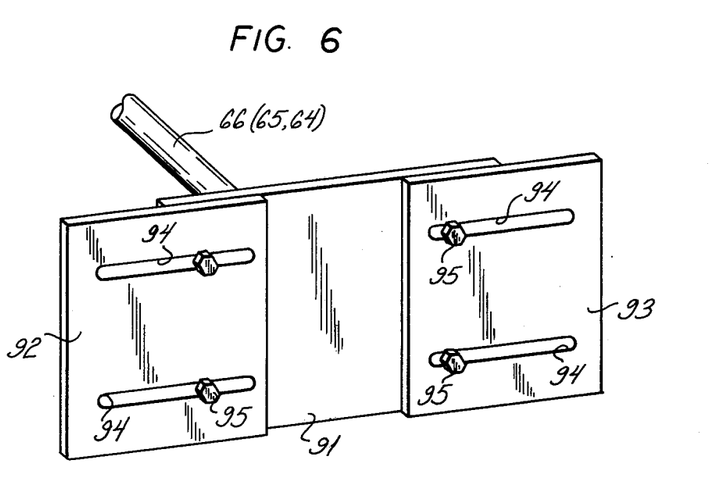
FIG. 6 is a perspective view of pressure panels for the collecting containers.
Figure 7:
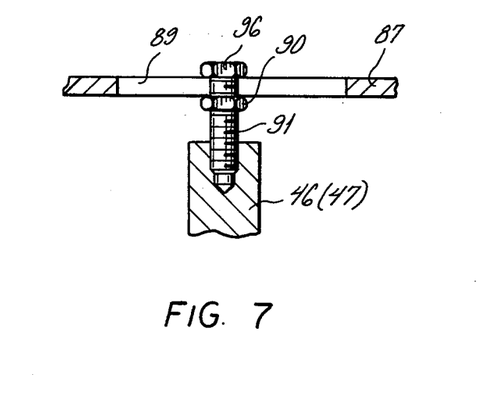
FIG. 7 shows on an enlarged scale a detail from FIG. 4a illustrating the partition attachment within the collecting container of the transporting vehicle.

As FIGS. 6 and 7 show, the storage space partitions 46 and 47 are laterally adjustable in parallel with each other and in relation to their length, in order that the storage chambers 48, 49 and 50 may be adapted to changing quantities of individual types of refuse within a relatively long period of time. For this purpose, the top end wall 87 of the receiving container 6 has, extending in the direction of its width, slots 89 to guide retaining bolts 91 secured by nuts 90. The retaining bolts 91a are inserted by a screw-thread into corresponding screw-threaded holes on the upper end faces of the partitions 46, 47 and are secured.

To provide an opportunity of varying the storage chamber width, it is envisaged that the pressing plates 60, 61, 62 and the load shovels 53, 54 and 55 should be variable in respect of width. For this purpose, each plate has mutually overlapping parts 91, 92, 93 having overlapping apertures 94. The plate parts 91, 92, 93 are locked by screw connectors 95 to one another to the desired size of pressure applying area which is formed jointly by the plate parts.

Figure 3A:
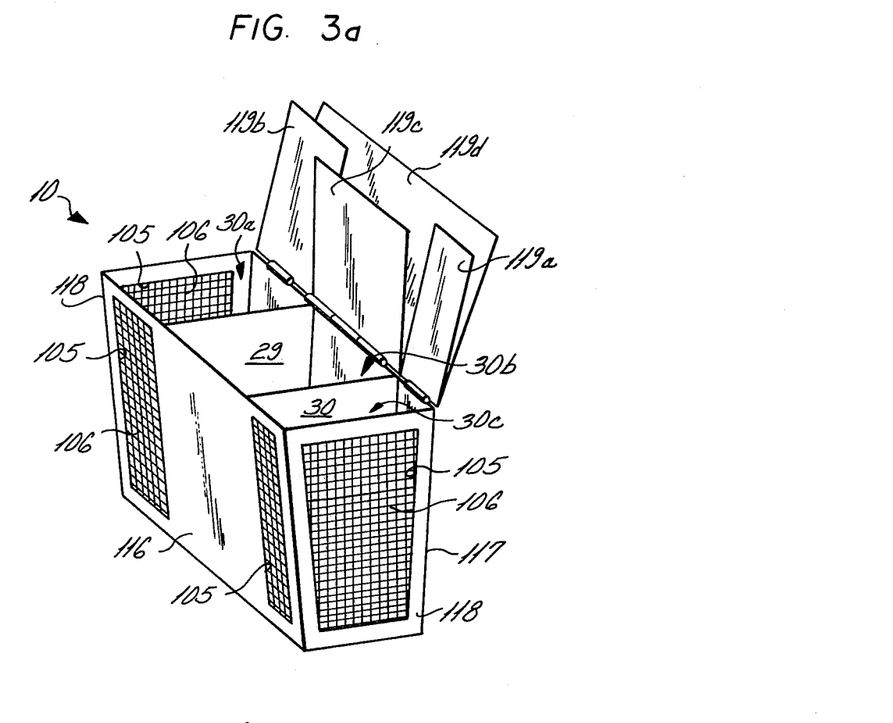
FIG. 3a is a perspective view of one embodiment of collecting container.
Figure 3B:
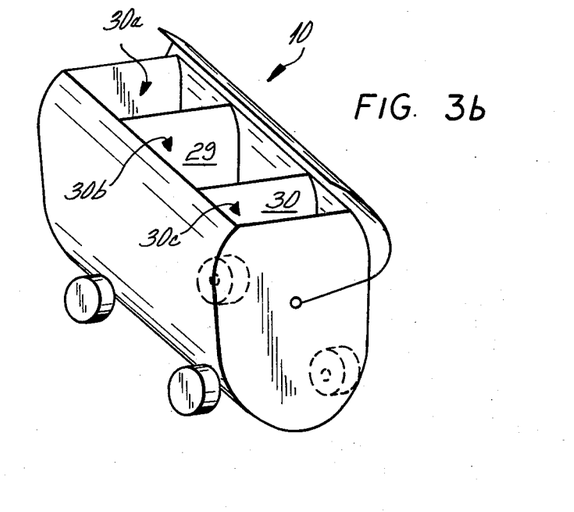
FIGS. 3b and 3c are perspective views of other embodiments of collecting container.
Figure 3C:
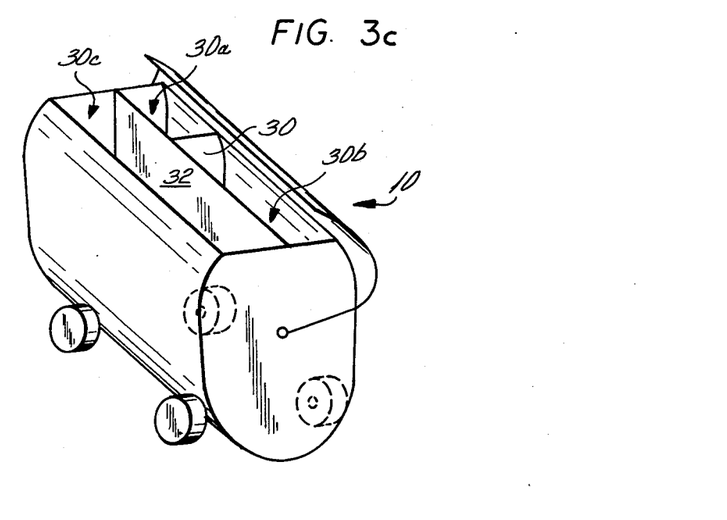

FIGS. 3a to 3d show the construction of domestic refuse collecting containers 10, which is, FIGS. 3a and 3b, composed of three adjacent chambers 30a, 30b and 30c framed by partitions 29 and 30, and the cross-sectional area of the openings of which are adapted to the corresponding cross-sectional areas of the filling apertures 16, 17, 18 or 16′, 17′, 18′.

Over a portion of their extent, the side walls have apertures 105 closed by gratings 106, whose aperture size is sufficiently large that refuse, for example kitchen refuse, can at least partially fall out through the gratings which provide a view at least into the chambers 30a and 30c.

Figure 3D:
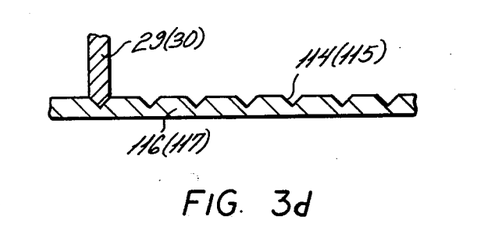
FIG. 3d is a detail of FIG. 3a, in section.

As FIG. 3d shows, also chamber walls or partitions 29 and 30 of the collecting containers 10 are made adjustable for adaptation to the variable width storage chambers 48, 49, 50. For this purpose, pairs of vertical grooves 114, 115 arepprovided in the front and rear end walls 116, 117 of the container 10, into which correspondingly formed partitions 29, 30 can engage.

The embodiments described are based on the premise that three types of refuse are to be received separately by the system. The types may be for example paper, glass and residual refuse in which for example kitchen waste will be contained. Of the container chambers 30a, 30b, 30c, it is intended that the middle chamber 30b should accommodate the residual refuse.

In known manner, the collecting containers are lifted by a lifting apparatus on the vehicle 2 (as schematically indicated by the long arrows in FIG. 1) and are positioned coincident with the apertures 13, 14 on the vehicle. The chambers 30a, 30b and 30c are brought into a position coincident with that of the partial apertures 16, 17, 18 when there is a possibility of dual charging, one set of apertures above the other, also in a position coincident with that of partial paertures 16′, 17′, 18′.

Refuse from a container 10 passes by gravity over the partitions 20, 21 or baffles 22, 23 to the vertical shafts 25, 26, 27 and separately into the feeder chambers 42′, 43′, 44′. From thence, the refuse is conveyed via the feeder shovels 42, 43, 44 to the load chambers 53′, 54′, 55′. The refuse is then fed to the storage chambers 48, 49, 50 in the container 6 by the load shovels 53, 54, 55.

The load shovels 53, 54, 55 co-operate with the pressing plates 60, 61, 62 to consolidate the refuse. By reason of the pressing apparatus, the pressing plates 60, 61, 62 of which also serve as ejector plates, and by reason of the fact that each plate 60, 61, 62 can be separately operated, it is possible also separately to discharge the separately loaded refuse. This can for example be done in such a way that while the vehicle 2 is on its way to a tip for residual refuse, or even following on from discharging the residual refuse, it may possibly call on users of the not yet discharged usable materials, for example glass or paper, who may be situated on the route, where the relevant usable materials can be separately discharged. As a result, travelling distance and time can be saved. It is also conceivable for separately loaded refuse to be simultaneously discharged again into separate containers, materials to be recycled being held therein ready for collection.

Pivotability of the baffles 22, 23 makes it possible for very dirty but re-usable materials, for example to be re-directed from filling shaft 25, into shaft 26 which is intended for residual refuse, by merely pivoting the baffle 22 about the axis 24′. The same is also possible with the re-usable materials in the shaft 27, by pivoting the baffle 23.

It is possible at any time, as a result of new production methods, new materials or the like, to vary the quantity of the individual materials in proportion to one another. The refuse collecting vehicle of the invention, by the possibility of varying the position of partitions within the vehicle, and in the collecting containers, can be adapted to these altered conditions. The collecting containers 10 can also comprise chambers 30a, 30b, 30c which are otherwise disposed with respect to one another. The receiving apparatus 5 on the vehicle 2 must then be adapted to suit these embodiments.

To avoid the residual refuse, i.e. in the separate households for example kitchen waste, being negligently charged into chambers intended to receive re-usable materials, the collecting containers may be so constructed that the chambers 30, 30c of the containers 10 have open wide walls 116, 117 and 118 which are closed by a grating 106. This makes it possible on the one hand for the operator of the vehicle to assess the composition of refuse in the individual chambers of the container, and possibly in the case of a high degree of contamination to direct the re-usable materials into the residual refuse chamber 49. On the other hand, the grating also provides an educational effect, since the residual refuse falls in part through the meshes of the grid 106, so compelling the operator to see that the refuse materials are poured into the correct chamber of the refuse container. The partitions 46 and 47 of the container 6 of the vehicle are preferably removable from the storage chamber so that the vehicle can also be used for carrying bulk refuse. A throw-in hole 120 serves to receive relatively large cartons or the like which are hand-loaded.

What we claim is:

1. A system for accommodating and transporting materials, for example domestic refuse, comprising a collecting vehicle and a plurality of collecting containers, wherein the vehicle has two or more chambers for receiving the materials and wherein each collecting container has the same number of material receiving chambers as the vehicle so that when a collecting container is applied to the vehicle for transferring the materials from the collecting container to the vehicle, the several chambers of the vehicle are adjacent the respective chambers of the collecting container.

2. A collecting vehicle for use in a system according to claim 1 having a receiving container sub-divided into two or more separate storage chambers and a separate feed and filling aperture corresponding to the number of separate chambers.

3. A vehicle according to claim 2, wherein a receiving apparatus is associated with the receiving container and comprises the separate filling apertures and having adjustable shovels for separate loading of refuse into the relevant chambers of the receiving container.

4. A vehicle according to claim 3, wherein the filling apertures of the receiving apparatus discharge into separate filling shafts and match the apertures of the chambers of the collecting container.

5. A vehicle according to claim 4, wherein the receiving apparatus has separate feed chambers communicating with the filling shafts, separate loading chambers being formed between the storage chambers and the chambers of the receiving container.

6. A vehicle according to claim 5, wherein a feed or load shovel is associated with each feed or load chamber.

7. A vehicle according to claim 3, wherein, for receiving simultaneously a plurality of collecting containers, there are on the receiving apparatus filling apertures situated one above another, each with a number of partial apertures.

8. A vehicle according to claim 7, wherein the receiving apparatus, to form substantially vertical filling shafts, comprises filling partitions which at the same time sub-divide the filling apertures into partial apertures.

9. A vehicle according to claim 8, wherein, adjacent the filling partitions, are baffles for separate distribution of refuse over the separate feed chambers.

10. A vehicle according to claim 9, wherein the baffles are adjustable about axes.

11. A vehicle according to claim 7, wherein the filling partitions and the storage space partitions are positionally adjustable.

12. A vehicle according to claim 2, wherein the partitions of the storage chamber are demountably disposed in the receiving container.

13. A vehicle according to claim 2, wherein one or more than one aperture separate from the filling apertures is or are provided into which items can be thrown.

14. A vehicle according to claim 2, wherein a pressing plate, with its own adjusting arrangement, is disposed in each storage chamber extending in the longitudinal direction of the vehicle.

15. A vehicle according to claim 14, wherein the pressing plates are adjustable in their width according to the adjustable partitions of the storage chamber, by means of mutually adjustable plate parts.

16. A collecting container for use in a system according to claim 1 having positionally adjustable partitions.

17. A container according to claim 16, at least some of whose side walls can be seen through.

18. A container according to claim 17, wherein at least some of the side walls have apertures closed by gratings.

19. A vehicle according to claim 1, wherein each collecting container is provided with an individual cover for each of the material-receiving chambers thereof.

20. A vehicle according to claim 19, wherein each collecting container is further provided with an overall cover which covers all material-receiving chambers of said container and also overlies the individual covers thereof.

* * * * *